July 17, 1962 D. M. MacMILLIN 3,044,347
CONTROL FOR MULTI-SPEED CAMERA
Filed Oct. 5, 1959 5 Sheets-Sheet 1
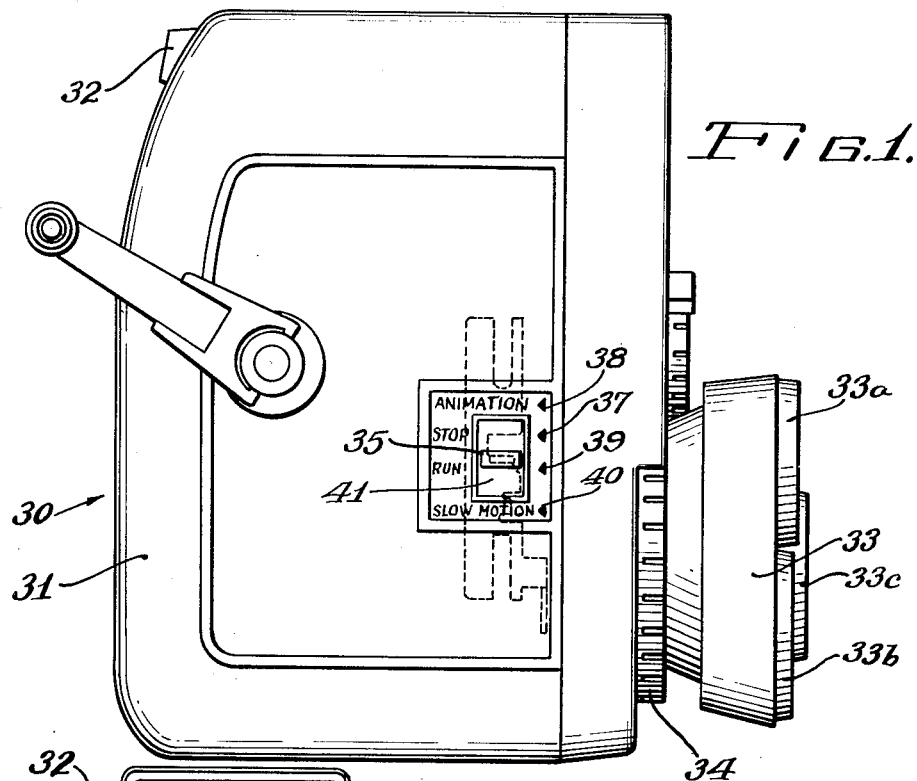
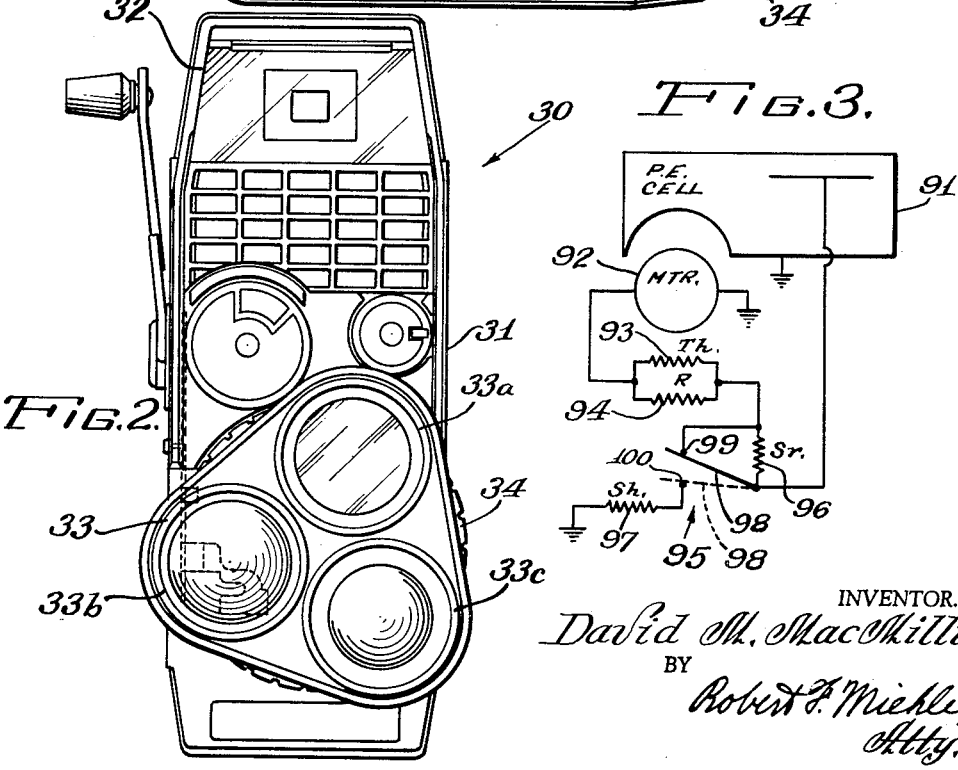
INVENTOR.
David M. MacMillin
BY
Robert F. Miehle, Jr.
Atty.

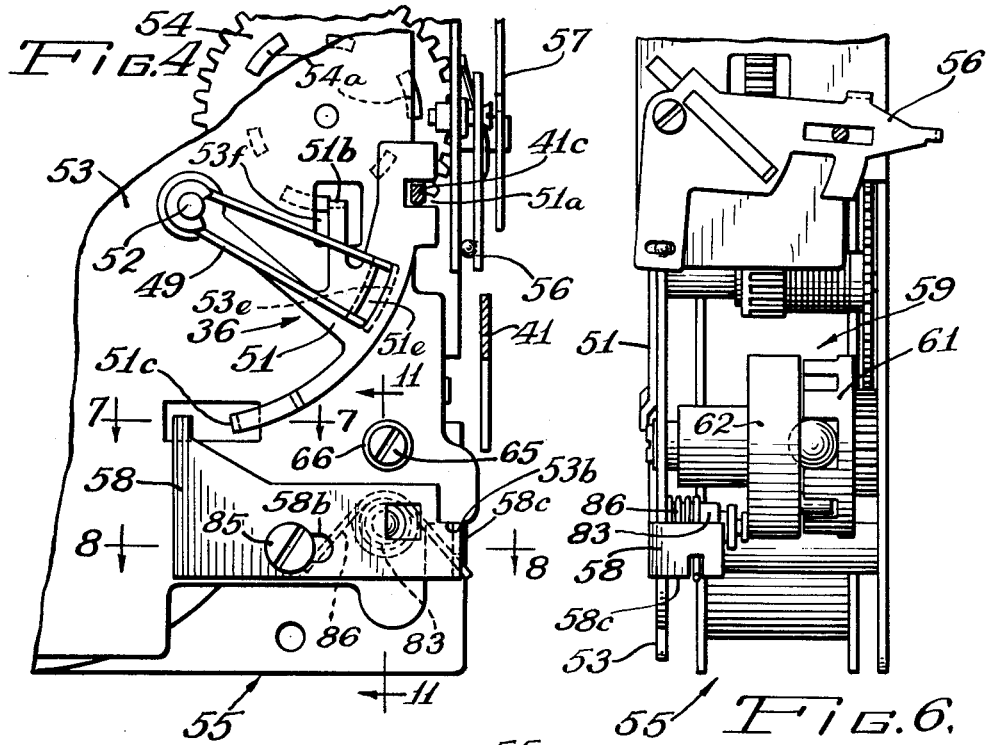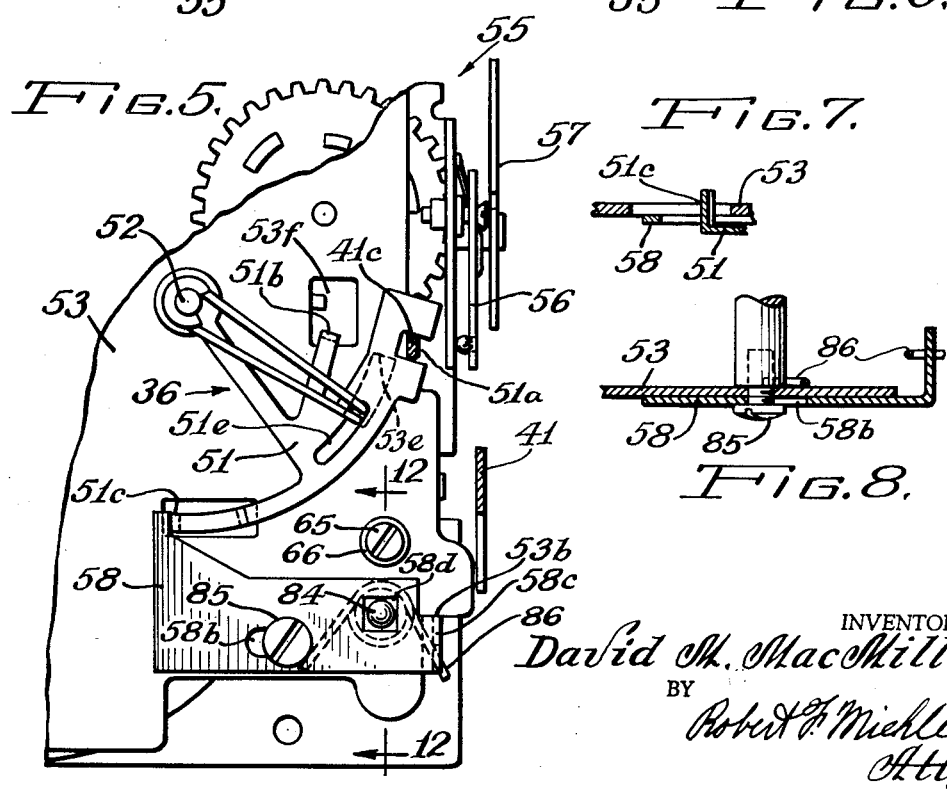

July 17, 1962  D. M. MacMILLIN  3,044,347
CONTROL FOR MULTI-SPEED CAMERA
Filed Oct. 5, 1959  5 Sheets-Sheet 3

INVENTOR.
David M. MacMillin
BY
Robert F. Miehle
Atty.

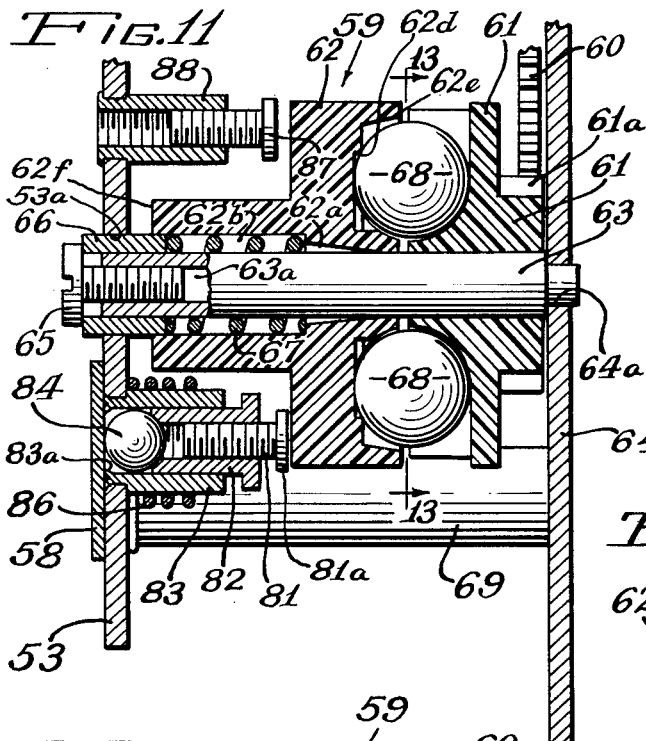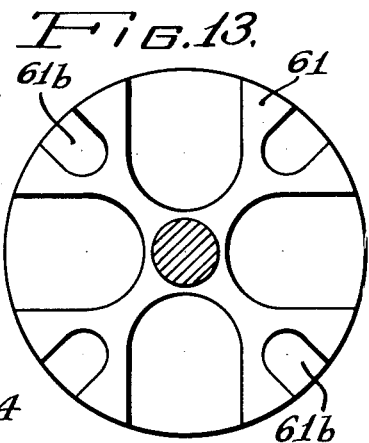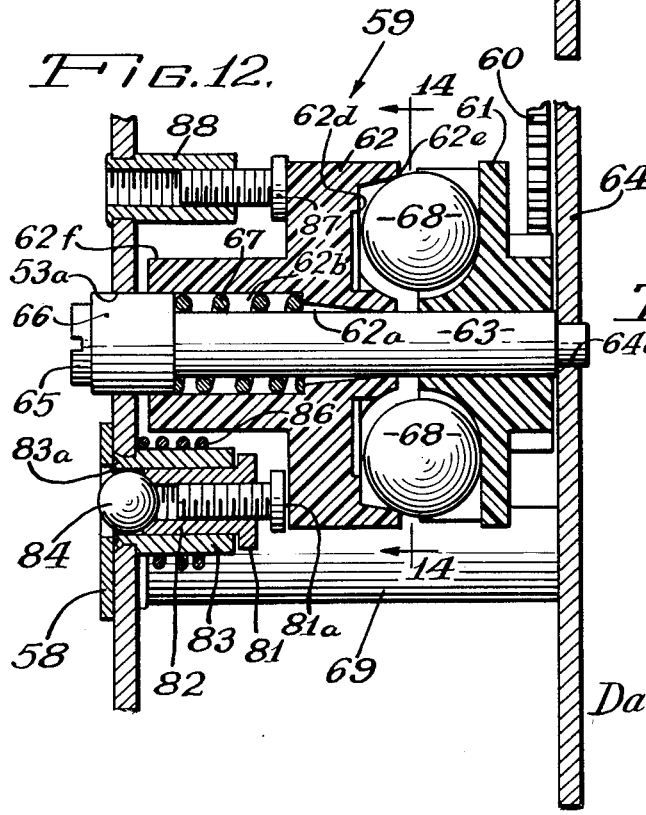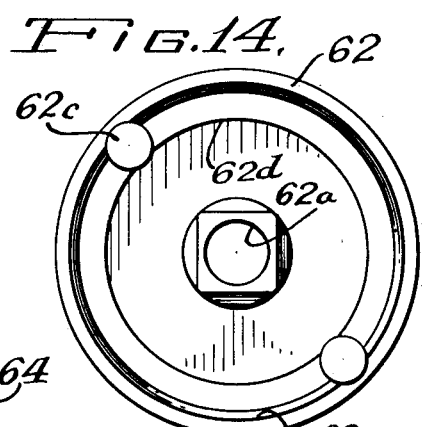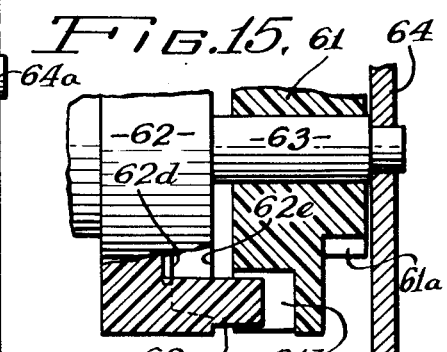

July 17, 1962 D. M. MacMILLIN 3,044,347
CONTROL FOR MULTI-SPEED CAMERA
Filed Oct. 5, 1959 5 Sheets-Sheet 5
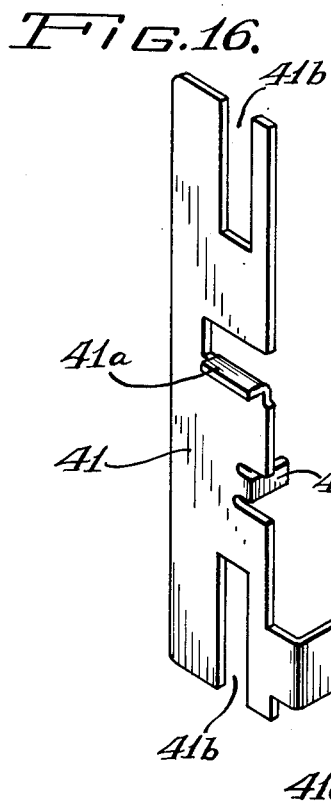
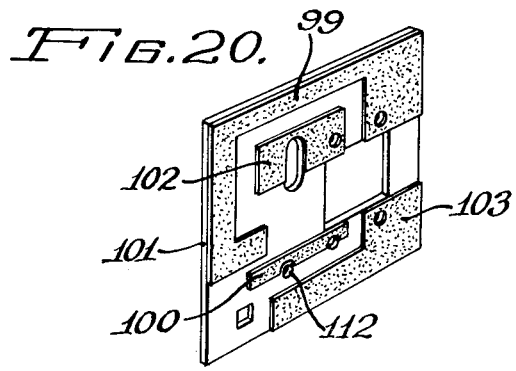
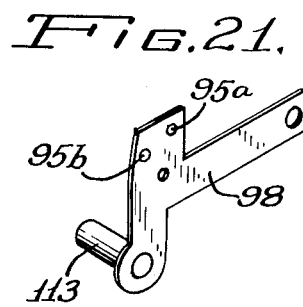
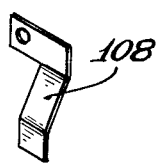
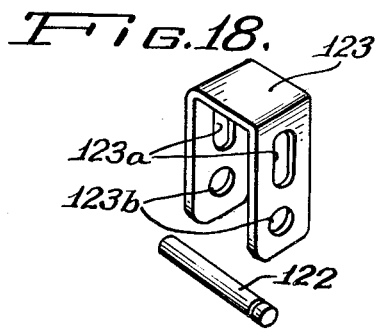
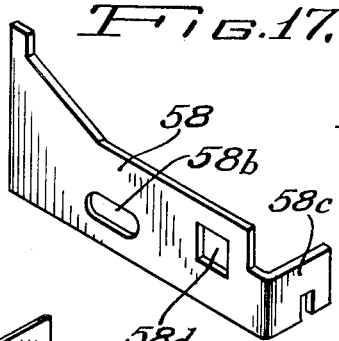
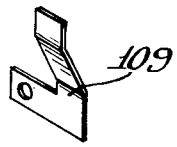
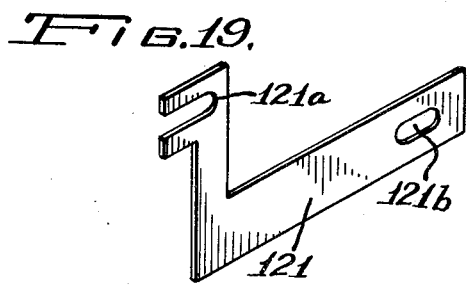
INVENTOR.
David M. MacMillin
BY Robert F. Miehle,
Atty.

United States Patent Office 3,044,347
Patented July 17, 1962

3,044,347
CONTROL FOR MULTI-SPEED CAMERA
David M. MacMillin, Wilmette, Ill., assignor to Bell & Howell Company, Chicago, Ill., a corporation of Illinois
Filed Oct. 5, 1959, Ser. No. 844,548
6 Claims. (Cl. 88—16)

This invention relates to a camera, and more particularly to a turret type motion picture camera having a two-speed governor and an interlock between the turret and the manual starting button to prevent actuation of the camera if the turret is not in proper position.

An object of the invention is to provide a new and improved governor control for a motion picture camera.

Another object of the invention is to provide a motion picture camera having an automatic exposure control mechanism together with a multispeed governor mechanism and a device operated automatically to compensate the exposure control means for different operational speeds of the camera.

Another object of the invention is to provide a speed responsive brake for a camera together with a manual shutter control for the camera which upon the initial portion of its movement releases the shutter drive and upon further movement sets the brake from a position permitting slow speed shutter operation to a position permitting high speed shutter operation and simultaneously actuates an automatic iris mechanism to a higher aperture range to compensate for the faster shutter speed.

A complete understanding of the invention may be obtained from the following detailed description of a camera forming a specific embodiment thereof, when read in conjunction with the appended drawings, in which:

FIG. 1 is a side elevation view of a camera forming one embodiment of the invention;

FIG. 2 is a front elevation view of the camera shown in FIG. 1;

FIG. 3 is a schematic view of a control circuit of an automatic exposure control device of the camera shown in FIG. 1;

FIG. 4 is an enlarged, fragmentary, side elevation view of the mechanism of the camera shown in FIG. 1;

FIG. 5 is an enlarged, fragmentary, side elevation view similar to FIG. 4 but with the operation control moved to "Slow Motion" position;

FIG. 6 is an enlarged, fragmentary, front elevation view of the mechanism shown in FIG. 4;

FIG. 7 is an enlarged horizontal sectional view taken along line 7—7 of FIG. 4;

FIG. 8 is an enlarged horizontal sectional view taken along line 8—8 of FIG. 4;

FIG. 11 is an enlarged, fragmentary, vertical sectional view of a speed-responsive brake or governor mechanism of the camera shown in FIG. 1;

FIG. 12 is a view similar to FIG. 11 but with some elements thereof in different positions from those shown in FIG. 11;

FIG. 13 is a face view of a rotor member of the brake and taken along line 13—13 of FIG. 11;

FIG. 14 is a face view of a second rotor member of the brake and taken along line 14—14 of FIG. 12;

FIG. 15 is an enlarged, fragmentary, partially sectional view of the brake shown in FIG. 11;

FIG. 16 is a perspective view of a slide member forming a portion of the operation control device of the camera shown in FIG. 1;

FIGS. 17, 18 and 19 are perspective views of elements of the operation control device; and FIGS. 20, 21, 22 and 23 are perspective views of a switch forming a portion of the camera shown in FIG. 1.

Figure 9:
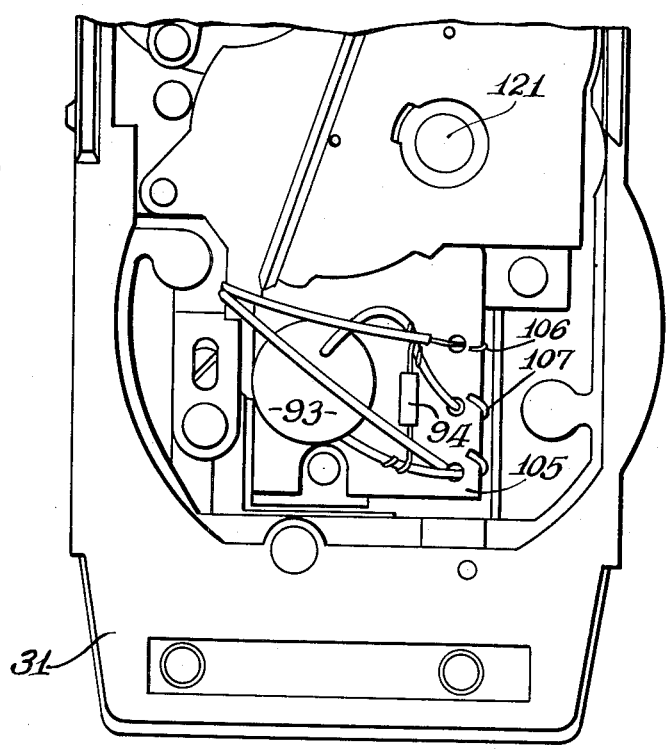
FIG. 9 is an enlarged, fragmentary, front elevation view of the camera mechanism.
Figure 10:
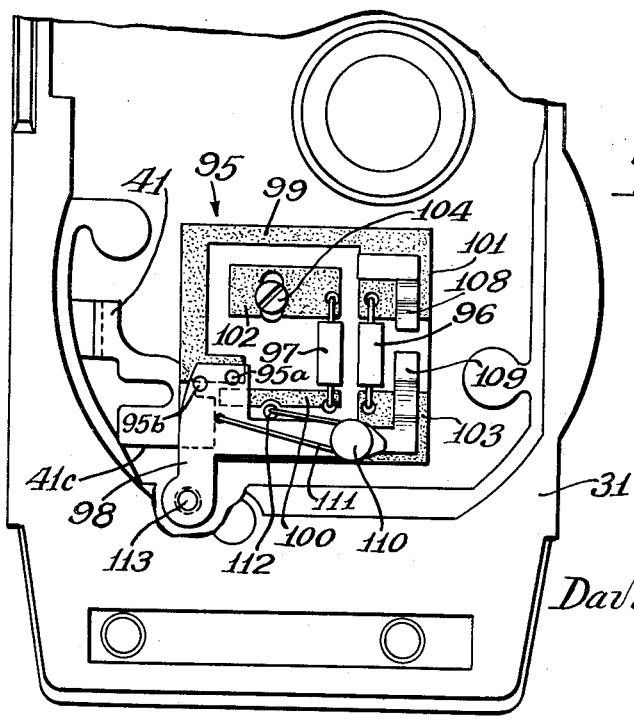
FIG. 10 is an enlarged, fragmentary, front elevation view of the camera mechanism.

The invention provides a camera having a speed responsive brake or governor which is driven by the mechanism drive of the camera. The brake preferably includes a pair of splined rotor members driven by the mechanism drive together with camming balls therebetween which respond to centrifugal force to urge one rotor member away from the other against a spring and against a fixed frictional braking member. The position of the braking member may be shifted by the operation control device to change the braking force and thus change the speed of the camera when the control device is actuated manually from normal operation to high speed or slow motion operation or the reverse. The operation control device, when actuated, also may actuate a switch to change a circuit to a galvanometer of an automatic exposure control device.

Referring now in detail to the drawings, there is shown in FIGS. 1 and 2 a motion picture camera 30 having a housing 31 together with a viewfinder 32 and a three-lens turret 33 having a rotatable plate 34. A handle button or bar 35 forms a portion of an operation control device 36 (FIG. 4), and may be moved manually upwardly from the "Off" position thereof aligned with arrow 37 as shown in FIG. 1 to an animation position aligned with arrow 38 to cause the camera to expose a single frame. The bar 35 also may be moved manually downwardly to a position aligned with arrow 39 to cause normal speed operation of the camera and also farther downwardly to a position aligned with arrow 40 to cause high speed or "Slow Motion" operation of the camera. The button 35 is molded or otherwise secured to a tab 41a (FIG. 16) of a slide member 41 slidable vertically on the inside face of the housing wall 31. The slide member 41 has guide slots 41b slidable on headed rivets (not shown) on the inside of the housing wall.

The slide member 41 has an operating tab 41c fitting into a slot 51a (FIG. 4) in a trigger arm 51, and swings the arm 51 on a pin 52 fixed to a mechanism plate 53 as the slide member 41 is moved manually to the several positions. The arm 51 normally is urged toward a centered position by a wire spring 49 having ends extending through slots 51e and 53e. When the arm 51 is moved clockwise from the "Off" position thereof shown in FIG. 4, it moves a tab 51b along a slot 53f out of the path of lugs 54a of a gear 54 of the spring motor driven drive train of the camera mechanism 55 which then drives a shuttle 56 and a shutter 57. For normal operation at a speed of, for example, sixteen frames per second, the arm 51 is swung beyond the release point to a normal camera operation or intermediate position between the position thereof shown in FIG. 4 and the "Slow Motion" position thereof shown in FIG. 5. In the intermediate position of the arm 51, a tab 51c of the arm 51 merely engages but does not move a brake actuating slide 58, and the drive train reciprocates the shuttle 56 and rotates the shutter 57 at the normal rate of speed as controlled by a speed responsive brake or governor 59 (FIGS. 11 and 12) driven by a gear 60 of the spring driven drive train. The tab 51c projects through slot 53g in the plate 53 so as to extend beyond the faces of the slide 58. The governor 59 includes drive and driven rotor members 61 and 62 rotatable on shaft 63 mounted rotatably in bearing hole 64a in mechanism plate 64. The member 62 has a tapered or relieved bore 62a and is freely slidable on the shaft 63 while the member 61 is fixed to the shaft 63 against rotative and longitudinal movement relative to the shaft. A cap screw 65 threaded into tapped bore 63a in shaft 63 adjustably positions a short sleeve 66 rotatable in bore 53a and forming a seat for compression spring 67 pressing also against the end of counterbore 62b in driven rotor member 62. The cylinder 66 also fits slidably into the counterbore 62b formed in a hub portion 62f. The spring 67 urges the rotor members 61 and 62 toward one another and against balls 68 of steel or the like entrapped therebetween. The members 61 and 62 preferably are composed of molded nylon. The mechanism plates 53 and 64 are secured together in spaced parallel positions by studs 69.

When the operation control member 35 (FIG. 1) is in its normal operation position, the member 61 (FIG. 11) is driven by the gear 60 of the shuttle and shutter drive through a gear portion 61a and drives the rotor member 62 by splining rods 62c (FIGS. 14 and 15) slidable in splining guideways 61b in the rotor member 61. The balls 68 are in radially extending grooves or guideways 61c and are revolved with the rotor member 61, and are urged by centrifugal action radially outwardly in the guideways 61c against a shoulder 62d of the member 62 to urge the member 62 to the left, as viewed in FIG. 11, along the shaft 63 and against the action of the spring 67 until this movement is limited by a brake member 81 having a disc-like shoe or head 81a. The member 81 is adjustably threaded into a tapped sleeve 82 slidable in a sleeve-like guide 83 fixed to the mechanism plate 53. The shoe 81a frictionally engages the rear face of the rotor member 82 near the periphery of the member 82 and brakes the rotation of the rotor member 62 and thereby the entire drive train of the shuttle and shutter to permit only the predetermined normal speed of operation of the camera. The sleeve 82 is pressed by the balls 68 through the member 62 and the brake member 81 against a ball 84 which is freely movable along the guide 83 between the sleeve 82 and the slide 58 when the slide 58 covers the end of the guide 83 as it does in normal speed operation. The slide 58 is held slidably on the plate 53 by a screw 85 (FIGS. 4 and 5) which projects through a slot 58b in the slide and is threaded into a tapped bore in the plate 53. A torsion spring 86 wound around the guide 83 has one end 86a anchored under the screw 85 and the other end under a tab 58c of the slide 58 to urge the slide 58 to the right, as viewed in FIGS. 4 and 5, to its normal speed operation position as illustrated in FIG. 4. The spring 86 urges the tab 58c against a guide edge 53b of the plate 53.

For "Slow Motion" operation of the camera, the slide 41 is pushed down manually until the slide 58 is moved by the tab 51c of arm 51 to the position of the slide shown in FIG. 5, in which position an opening 58d uncovers the end of the ball 84. This permits the ball 84 to move to the left from the position thereof shown in FIG. 11 to a position abutting an overhanging rim 83a as shown in FIG. 12, the rim 83a being formed by a swaging operation which also rivets the guide 83 to the plate 53. This permits the brake 81 and sleeve 82 to be pushed to the left by the balls 68 from the positions thereof shown in FIG. 11 to the positions of FIG. 12, in which latter positions, the balls 68 clear the corner or shoulder 62d and are pressed by centrifugal force against an outer corner or shoulder 62e of the rotor member 62. The member 62 is generally cup-shaped and it alone limits radial movement of the balls 68. The shoulder 62e is positioned much farther to the right, as viewed in FIGS. 11 and 12, than the shoulder 62d so that the components of force between the balls and the shoulder 62e parallel to the longitudinal axis of the member 62 are much less than the similar components between the balls 68 and the shoulder 62d when the balls engage the shoulder 62d. Hence, when balls 68 engage shoulder 62e in the high speed or "Slow Motion" position of the brake, the forces of the balls pressing member 62 against a brake member 87 is predeterminedly less than when the brake 81 is in the slower speed or normal operation position. The braking effect also is predeterminedly less. The brake member 87 is adjustably fixed to plate 53 by a flanged bushing 88 staked to plate 53. Brake members 81 and 87 may be threaded individually farther into or out of members 82 and 88 to vary the braking effect.

The camera 32 is provided with an automatic exposure control mechanism generally of the type disclosed and claimed in co-pending application Serial No. 796,562, filed March 2, 1959 and assigned to the same assignee as the instant application. The exposure control mechanism of the camera 32 includes a photo-voltaic cell 91 (FIG. 3) responsive to illumination of the scene to be photographed and supplies operating current to a meter or galvanometer 92 which drives an iris or diaphragm mechanism (not shown) preferably of the type shown in said application Serial No. 796,562. The circuit of FIG. 3 includes a temperature compensating network composed of thermistor 93 and resistor 94, a switch 95, a series resistor 96 and a shunt resistor 97. The shutter speed is much higher during "Slow Motion" operation of the camera than during normal operation and, to compensate for this difference, the iris or diaphragm must be more open during "Slow Motion" than during normal operation. The meter 92 closes or stops down the diaphragm proportionally to the current supplied thereto, and, during normal operation of the camera, a contactor 98 of the switch 95 is in engagement with contact 99 to shunt both the resistors 96 and 97 out of the circuit to the meter so that full current from the cell 91 is supplied to the meter. However, for "Slow Motion" operation of the camera, the switch contactor 98 is moved out of engagement with the contact 99 and into engagement with contact 100 to connect the resistor 96 in series with the meter and the resistor 97 in shunt with the meter. This reduces the current to the meter so that the diaphragm is not stopped down so much for a given illumination of the cell than when the contactor 98 engages the contact 99. Thus, the exposure control device works in a different range of diaphragm openings for "Slow Motion" than for normal operation of the camera.

The construction of the switch 95 is illustrated best in FIGS. 10, 20, 21, 22 and 23. The switch includes a printed circuit board 101 of electrical insulating material having the contacts 99 and 100 printed thereon along with printed electroconductive areas 102 and 103 with the resistor 96 being connected across contact 101 and printed area 103 and the resistor 97 being connected to the contact 100 at one end and to electro-conductive area 102 at the other end. A screw 104 is screwed into a suitable tapped bore in the housing of the camera to mount the board 101 in the camera and also to electrically ground the area 102. A terminal board 105 (FIG. 9) of electrical insulating material carries the thermistor 93 and resistor 94 and is mounted in the camera in front of the board 101 with conductors 106 and 107 connected to these elements pressed into electrical contact with spring contacts 108 and 109 (FIG. 10), respectively, to connect the resistor 94 and thermistor 93 into the circuit as shown in FIG. 3. The contactor 95 has contacting dimples 95a and 95b (FIG. 10), and is urged clockwise, as viewed in FIG. 10, about a mounting rivet 110 connecting the contactor 95 to the printed electro-conductive area 103 and mounting the contactor 95 pivotally. For normal speed operation, a torsion spring 111 anchored at one end in hole 112 in an uncovered or non-conductive portion of the insulating board 101 urges the contactor against the upper end of the spring 111 and the contacting dimples both engage the contact 99 to cause the resistors 96 and 97 to be cut out of the meter circuit as illustrated by the full-line position of the contactor 98 in FIG. 3. However, as the slide member 41 is moved downwardly to its "Slow Motion" position, a tab 41c engages a rigid rod 113 of electrical insulating material fixed to the contactor 95 and swings the contactor 95 counter-clockwise, as viewed in FIG. 10, to move the contactor 95 completely out of contact with the contact 99 and move the dimple 95a into contact with the contact 100. This forms the circuit illustrated in FIG. 3 with the contactor 95 in its broken-line position with the resistors 96 and 97 connected into the meter circuit.

In order to prevent operation of the camera when aperture 121 (FIG. 9) has none of the three lens members 33a 33b and 33c (FIG. 2) aligned therewith, a ball detent (not shown) movable in a hole through the front of the housing 31 is urged by a leaf spring 121 (FIG. 19) against the turret plate 34. When one of the lens members is properly aligned with the aperture, a socket (not shown) in the plate 34 receives the ball detent and a rod 122 (FIG. 18) is pulled along a guide 123 fixed to the housing 31 out of a slot 41d (FIG. 16) to permit actuating movement of the slide 41. Whenever the turret is not in position with one of its lens members aligned with the aperture, an unrecessed portion of the turret plate 34 pushes through the ball detent the spring 121 to push the pin 122 into the slot 41d to prevent movement of the slide 41. The guide 123 has aligned slots 123a through which a screw (not shown) projects to secure the guide 123 fixedly to the housing. The guide 123 has aligned bores 123b for the pin 122, which has a groove 122a with which a slotted end 121a of the spring 121 interlocks. The spring 121 is fixed to the camera housing by a screw (not shown) projecting through a slot 121b in the spring 121.

The camera described above may be operated both at normal speed and at "Slow Motion" merely by pushing the button 35 to the desired position. The governor or brake precisely keeps the camera at the selected speed of operation, and the automatic exposure control device also is automatically set in the desired range of operation corresponding to the operating speed of the camera.

While the invention is thus described, it is not wished to be limited to the precise details described, as changes may be readily made without departing from the spirit of the invention.

What is claimed is:

1. In a motion picture camera including a camera drive, an automatic exposure control device and a housing, a multi-speed governor mechanism for controlling the speed of the camera drive, a drive control member for starting and stopping the drive, a manual control member for operating the drive control member, means operable by the drive control member for setting the governor mechanism at a selected speed, and means for adjusting said exposure control device and mounted in the housing in a position adapted to be actuated by the manual control member in synchronism with the setting of the governor, whereby the exposure will be automatically corrected in accordance with changes in camera speed effected by movement of the manual control member.

2. In a motion picture camera including an adjustable multi-speed camera drive, an automatic exposure control device and a housing, speed control means for controlling the speed of the camera drive, drive control means for starting and stopping the drive, a manual control member for operating the drive control means, means operable by the manual control member for setting said speed control means at one of a plurality of predetermined speeds, and means for adjusting the exposure control device and adapted to be actuated in synchronism with the setting of the speed control means, whereby the exposure will be automatically corrected in accordance with changes in camera speed effected by movement of the manual control member.

3. In a motion picture camera including a housing, a control member manually movable selectively to three positions inside of the housing and operable manually from the exterior of the housing, a camera drive having a plurality of speeds, and drive control means operable by the control member when in one of said positions to stop the drive, the drive control means being operable by the control member when the control member is in another of said positions to run the camera drive at a predetermined speed, the drive control means also being operable by the control member when the control means is in another of said positions to run the camera drive at a speed different from said predetermined speed.

4. In a motion picture camera including a camera drive, a shutter driven by the camera drive, drive control means for starting and stopping the drive, a governor adjustable to control the drive and the shutter between a predetermined normal operation speed and a slow motion speed substantially faster than the normal operation speed, a manual control member for operating the drive control means, and means operable by said manual control member for adjusting the governor between the normal operation speed and the slow motion speed, adjustable diaphragm means for controlling light, light-responsive means for adjusting the diaphragm means, and variable means responsive to setting of the governor for adjusting the light-responsive means in accordance with the setting of the governor, whereby the diaphragm means will be automatically adjusted to admit the proper amount of light in accordance with changes in camera speed effected by movement of the manual control member.

5. The camera of claim 4 wherein the light-responsive means includes a galvanometer for driving the diaphragm means and the variable means includes a resistor and means for connecting the resistor in circuit with the galvanometer in such a manner as to reduce the power output of the galvanometer when the drive is operating at its slow motion speed.

6. The camera of claim 5 wherein the variable means includes switch means operable by the manual control member to connect the resistor in series with the galvanometer during slow motion speed operation of the drive and shunting the resistor during normal speed operation of the drive.

References Cited in the file of this patent

UNITED STATES PATENTS

| | | |
|---|---|---|
| 1,897,762 | Morsbach | Feb. 14, 1933 |
| 1,935,327 | Morsbach et al. | Nov. 14, 1933 |
| 1,941,473 | Howell | Jan. 2, 1934 |
| 2,073,803 | Phillmore et al. | Mar. 16, 1937 |
| 2,080,055 | Martin | May 11, 1937 |
| 2,105,631 | Becker | Jan. 18, 1938 |
| 2,126,338 | Mihalyi | Aug. 9, 1938 |
| 2,261,532 | Tonnies | Nov. 4, 1941 |
| 2,515,330 | Bolsey | July 18, 1950 |
| 2,653,507 | Riles et al. | Sept. 29, 1953 |
| 2,922,347 | Hahn et al. | Jan. 26, 1960 |